United States Patent [19]

Taller

[11] 4,075,152
[45] Feb. 21, 1978

[54] PROCESS FOR STABILIZING PIGMENT DISPERSIONS IN URETHANE COATINGS

[75] Inventor: Robert Arthur Taller, Charleston, W. Va.

[73] Assignee: Union Carbide Corporation, New York, N.Y.

[21] Appl. No.: 672,951

[22] Filed: Apr. 2, 1976

[51] Int. Cl.$^2$ ............................................. C08L 75/04
[52] U.S. Cl. ........................... 260/37 N; 106/308 N; 260/2.5 AK; 260/77.5 AA
[58] Field of Search ............. 260/2.5 AK, 37 N, 34.2, 260/77.5 AA; 106/308 N

[56] References Cited

U.S. PATENT DOCUMENTS 3,429,855  2/1969  Cobbledick .................. 260/37 N X
3,896,303  7/1975  Gerkin et al. ........... 260/77.5 AN X

FOREIGN PATENT DOCUMENTS 122,229    2/1972   Denmark ......................... 260/37 N
45-4180    2/1970   Japan ............................. 260/37 N
839,189    6/1960   United Kingdom .......... 260/2.5 AK
1,046,362  10/1966  United Kingdom .......... 260/2.5 AK

*Primary Examiner*—Lewis T. Jacobs
*Attorney, Agent, or Firm*—Peter R. Shearer

[57] ABSTRACT

When pigments which are to be dispersed in the polyol package of a two-package urethane coating are pretreated by slurrying in an organic polyisocyanate, pigment flocculation is inhibited. Coating properties, such as gloss, weatherability, hardness and chemical resistance, are thereby improved.

12 Claims, No Drawings

PROCESS FOR STABILIZING PIGMENT DISPERSIONS IN URETHANE COATINGS

BACKGROUND OF THE INVENTION

Two-package urethane coatings produced by reacting an organic polyol with an organic polyisocyanate or an isocyanato terminated prepolymer are known in the art. In many instances, it is desired to have a pigmented two-package urethane coating wherein the pigment is dispersed in the polyol package prior to the application of the coating. Usually, the pigment is dispersed in the polyol package by the use of high shear mixing equipment such as a three roll mill, sand mill or Cowles type mixer. A problem has been observed in certain of these polyol-dispersed pigmented two-package urethane coatings in that the pigment particles tend to flocculate when the pigmented polyol package contacts the polyisocyanate or isocyanato terminated prepolymer package. The resultant poor pigment dispersion in the applied coating impairs the physical properties of the coating, such as gloss, weatherability, hardness, abrasion resistance and chemical resistance. The flocculation problem is particularly severe when pigments are used which are initially difficult to disperse in the polyol package, for example, titanium dioxide. The degree to which pigment flocculation occurs is also believed to be partially dpendent on the pigment wetting characteristics of the particular organic polyol and organic polyisocyanate used in the two-package urethane coating. As a result of pigment flocculation, many pigmented two-package urethane coatings do not exhibit the same degree of gloss, weatherability and physical properties which they exhibit in unpigmented form.

Previous efforts to overcome pigment flocculation have been directed primarily toward stabilizing the pigment dispersion in the polyol package by the use of surface active dispersing agents, which are known in the art. These include the anionic, cationic, electro-neutral, amphoteric and non-ionic surface active dispersing agents. None of these methods has been completely successful.

SUMMARY OF THE INVENTION

It has now been discovered that when the pigment is slurried in a small amount of an organic polyisocyanate to form a predispersion prior to dispersing the pigment in the polyol package of a two-package urethane coating, unexpected and nonobvious improvements are obtained in the physical properties of the applied coatings, such as gloss, weatherability, hardness, abrasion resistance, flexibility and chemical resistance. While improvements in physical properties can be obtained in many different pigmented two-package urethane coatings by the method of this invention, the greatest improvements in properties have been observed in two-package coatings which employ polycaprolactone polyols and certain aliphatic polyisocyanates, as further illustrated hereafter.

DESCRIPTION OF THE INVENTION

The pigmented coatings which can be advantageously treated by the method of this invention are any of the two-package urethane coatings in which the pigment is contained in the polyol package. The term "two-package urethane coating" is so well know to those skilled in the art as to require no further definition herein. Those skilled in the art also know the organic polyisocyanates and organic polyols which can suitably be employed in two-package urethane coatings. Nonetheless, one can mention, as examples of suitable organic polyisocyantes, aliphatic and cycloaliphatic polyisocyanates such as 1,4-hexamethylene diisocyanate, 1,6-hexamethylene diisocyanate, 4,4'-methylene-bis(cyclohexylisocyanate), trimethylene diisocyanate and isophorone diisocyanate, aryl and alkaryl polyisocyanates such as 2,4- or 2,6-tolylene diisocyanate, 4,4'-diphenylmethane diisocyanate, naphthalene-1,5-diisocyanate, 1,3- and 1,4-xylylene diisocyanate, 4,4'-diphenylpropane diisocyanate, 1,-chlorophenylene2,4-diisocyanate and triphenyl-methane-4,4',4"-triisocyanate; isocyanato terminated prepolymers obtained by reacting an excess of any of the above with an organic polyol; biuret-containing polyisocyanates produced by reacting any of the above polyisocyanates with water as described in U.S. Pat. Nos. 3,706,678 and 3,201,372; or any mixtures of the foregoing, One can mention, as illustrative of suitable organic polyols, polyether polyols such as polypropylene glycol, polyethylene glycol, trifunctional propylene oxide-glycerol adducts, polyisobutylene glycol and polytetramethylene glycol; polyester polyols obtained by reacting one or more polyfunctional acids such as adipic acid, isophthalic acid, phthalic acid or its anhydride, with a polyol such as neopentyl glycol, trimethylolpropane, 1,4-butylene glycol, 1,4- or 1,6-hexylene glycol or pentaerythritol; hydroxyl bearing vinyl monomers known in the art as acrylic polyols, such as the reaction product of hydroxymethyl methacrylate, styrene and methyl methacrylate; other suitable hydroxyl bearing vinyl polymers, including styrene/allyl alcohol copolymers and similar resinous polyols; the reaction product of epsilon-caprolactone or an alkyl substituted epsilon-caprolactone and a di- or trifunctional initiator such as trimethylolpropane, butanediol or diethylene glycol; the reaction product of a polycaprolactone polyol having a functionality of at least 3 and an organic polyepoxide as described in U.S. Pat. No. 3,896,303; and mixtures of the foregoing. Additionally, one can mention as useful polyols, ethylene glycol, propylene glycol, butylene glycol, pentylene glycol, hexylene glycol, octylene glycol and their isomers; diethylene glycol, triethylene glycol and tetraethylene glycol. While those additional polyols can be used alone as the polyol component of the two-package urethane coating, they are usually used in combination with the previously mentioned polyols and act as viscosity reducers.

The foregoing lists of suitable organic polyols and organic polyisocyanates are meant to be illustrative only and not to exclude any compounds which have known utility in two-package urethane coatings.

In addition to the organic polyisocyanates and organic polyols mentioned above there may also be present in the two-package urethane coating any catalysts, solvents, grinding aids, leveling aids or other additives conventionally employed in urethane coatings in the usual amounts.

The method of this invention can be used to treat any of the pigments conventionally employed in two-package urethane coatings. These are well known to those skilled in the art. Nonetheless, one can mention, as examples of such pigments, inorganic pigments such as rutile or anatase titanium dioxide, mixtures of titanium dioxide and calcium sulfate, basic carbonate white lead, antimony trioxide, zinc oxide, zinc sulfide, iron oxide, the cadmium sulfoselenides, barium sulfate, calcium carbonate, cuprous oxides, lead chromate, lead molybdate, and carbon black; organic pigments such as the phthalocyanine greens and blues, toluidine red, pyrazoline red and maroon, thioindigold red and maroon, quinacridone, rhodamine, orthonitraniline orange, dinitraniline orange and indanthrone blue; and metallic pigments such as aluminum powders and pastes, gold bronze powder and zinc dust and flakes. The foregoing list is illustrative only and is not meant to exclude any pigments having utility in two-package urethane coatings.

As previously mentioned, the present invention involves pretreating the pigment by forming a slurry predispersion in an organic polyisocyanate prior to dispersing the pigment in the polyol package of the two-package urethane coating. Any of the organic polyisocyanates which are known to be suitable for use in the isocyanate package of the two-package urethane coating are also suitable for pretreating the pigment. From the standpoint of producing a pigmented two-package urethane coating having maximum initial gloss and gloss retention after outdoor exposure, I prefer to slurry the pigment in 4,4'-methylene bis(cyclohexyl isocyanate). The organic polyisocyanate is used in the slurry pretreatment in an amount equal to from about 0.5 to about 50 per cent of the weight of pigment being pretreated, preferably from about 1 to about 25 per cent. In addition to the pigment and the organic polyisocyanate, a solvent can be present in the slurry predispersion and may be useful in achieving a uniform slurry composition. Any conventional solvent can be employed which is essentially chemically inert to the organic polyisocyanate and does not interfere with the formation of a homogeneous slurry.

The slurry predispersion can be prepared using any of the well known types of mixing equipment suitable for dispersing solid particles in a liquid medium, preferably equipment which imparts high shear forces to the particles such as, for example, a pebble mill, sand mill or Cowles type mixer. The pigment and organic polyisocyanate are dispersed for a sufficient period to form a uniform mixture and bring the pigment particles into intimate contact with the organic polyisocyanate. The organic polyol is then added to the slurry predispersion and the mixture is dispersed to form the polyol package of the two-package urethane coating. Additionally, grinding aids and other conventional additives may be employed in the usual amounts in forming the polyol package. The polyol package thus formed can be reacted in any conventional manner with an organic polyisocyanate to form a two-package urethane coating.

It has been observed that the degree and type of improvements in coating properties effected by the process of this invention vary somewhat from coating to coating. Thus, one may observe that a particular two-package urethane coating in which the pigment has been treated by the process of this invention benefits principally in improved gloss and weatherability, while a different two-package urethane coating benefits principally in improved hardness, chemical resistance and abrasion resistance. In one particularly important embodiment of the invention, a titanium dioxide pigment was predispersed in 4,4'-methylene-bis(cyclohexyl isocyanate) and dispersed in the polyol package of a two-package urethane coating in which the polyol was a polycaprolactone polyol and the polyisocyanate was the biuret of hexamethylene diisocyanate. The applied coating exhibited an initial gloss level which was 17% higher than that of a similar coating which had not received the treatment of this invention (Gardner 20° glossmeter, scale of 0 to 100). Moreover, after 650 hours exposure in an accelerated weathering simulator the gloss level of the treated coating was greater than three times that of the untreated coating. This and other embodiments are further illustrated by the examples which follow. The examples are not intended to limit the scope of the invention in any way.

In the examples that follow, the designations indicated in the first column of Table I will be used in lieu of the complete description in the second column.

TABLE I

| DESIGNATION | COMPOSITION |
|---|---|
| Polycaprolactone polyol A | The hexafunctional reaction product of: (a) 1.5 moles of the adduct of epsilon-caprolactone and trimethylolpropane having a hydroxyl number of 560; (b) 1.0 mole of the adduct of epsilon-caprolactone and trimethylolpropane having a hydroxyl number of 310; and (c) 1 mole of 3,4-epoxycyclohexylmethyl 3,4-epoxycyclohexane) carboxylate. This polyol had an equivalent weight of 164. |
| Polycaprolactone polyol B | The hexafunctional reaction product of 2.5 moles of the adduct of epsilon-caprolactone and trimethylolpropane having a hydroxyl number of 560 and 1 mole of 3,4-epoxycyclohexylmethyl (3,4-epoxycyclohexane) carboxylate. This polyol had an equivalent weight of 133. |
| Polyester polyol A | A commercially available polyfunctional reaction product of phthalic anhydride and trimethylolpropane having an equivalent weight of 212. |
| Polyisocyanate A | A biuret of 1,6-hexamethylene diisocyanate having a free NCO content of about 17 weight per cent. |
| Leveling Agent | $(CH_3)_3SiO\left[\begin{array}{c}CH_3\\|\\SiO\\|\\CH_3\end{array}\right]_7\left[\begin{array}{c}CH_3\\|\\SiO\\|\\C_3H_6-(OC_3H_6)_{12}-OC_4H_9\end{array}\right]_3 SiCH_3$ |

Table II indicates the standard tests or test instruments used to determine the physical properties of the coatings in the examples.

TABLE II

| Property | Test |
|---|---|
| Reflectance | Coatings were visually observed and rated for reflectance, mirroring and clarity. A rating of 10 was assigned to perfect reflectance, mirroring and clarity, 0 to a flat finish. |
| Gardner ° gloss | Gardner gloss meter (scale of 0 to 100, 100 = mirror finish). |
| Pencil hardness | The "leads" of pencils containing "lead" of different hardnesses are ground flat, perpendicular to the axis. The coating is then scratched with the edge of the "lead". The hardest "lead" (e.g., H,2H) which does not penetrate through the coating to the substrate is designated as the pencil hardness of the coating. |
| Sward hardness | Sward hardness tester (ASTM D2134-66) |
| Gardner impact | Gardner impact tester (ASTM D2794-66) |
| Taber abrasion resistance | 1,000 gram weight, 1,000 cycles CS-10 wheel; indicates weight lost (mg.) during test. (ASTM D1044-56.) |

TABLE II-continued

| Property | Test |
|---|---|
| Chemical resistance | Small amounts of various chemicals were placed on the coatings, covered with a plastic bottle cap to form an air pocket over the coating, allowed to stand 24 hours and rinsed off with warm water. The coatings were observed for chemical attack. A rating from 0 to 10 was assigned, with a value of 0 representing complete coating failure and 10 representing no effect on the coating. |

The accelerated weathering simulator used in Examples 1 and 2 had two specimen-holding racks and two banks of four 48-in. long phosphor coated fluorescent lights which emitted ultraviolet light in wavelengths from 280 nm. to 350 nm. Each bank of lights was arranged in a plane parallel to the plane formed by the coated specimen panels in one of the specimen holding racks. The base of the accelerated weathering simulator held a water trough with means for vaporizing the water in the trough to allow the air in the test chamber to be kept at 100% relative humidity. Temperature controls and cycle timers were also provided, so that the test specimens could be subjected to alternating periods of ultraviolet light at temperatures from 122° F. to 158° F. and 100% relative humidity at temperatures from 104° F. to 158° F.

EXAMPLE 1

A titanium dioxide pigmented two-package urethane coating, identified as coating A, was prepared, as a control, in the following manner. A pigment grind was prepared by charging the components indicated in the table below to a pebble mill and grinding to a fineness of greater than Hegman 7. There was then slowly added to the pigment grind, with mixing, the amount of polyisocyanate A indicated in the coating formulation below. The indicated amounts of leveling agent and 2-ethoxyethyl acetate were added to the mixture with stirring, followed by the dibutyltin dilaurate.

| Pigment Grind | Weight, g. |
|---|---|
| TiO$_2$ (rutile) | 94.95 |
| 2-ethoxyethyl acetate | 68.00 |
| Polycaprolactone polyol A | 83.00 |
| Soya Lecithin | 1.9 |
| Coating Formulation | Weight, g. |
| Polyisocyanate A | 50.00 |
| Pigment grind | 86.93 |
| Leveling agent | 0.067 |
| 2-ethoxyethyl acetate | 31.00 |
| Dibutyltin dilaurate | 0.0133 |

The coating formulation, which had a No. 2 Zahn cup viscosity of 25 seconds, was sprayed onto Bonderite No. 37 steel panels at a coating thickness of from 1.8 to 2.2 mils. After standing for 5 minutes at room temperature, the coatings on the panels were cured for 20 minutes at 180° F. and aged at room temperature for 7 days.

A series of four titanium dioxide pigmented two-package coatings, identified as A-1 through A-4, were prepared using the pigment pretreatment process of this invention. The organic polyisocyanate used to pretreat the pigment in each coating is indicated below. The remaining components of each coating were identical to those used to form the control coating.

| Coating | Pretreating Organic Polyisocyanate | Weight, g. |
|---|---|---|
| A-1 | 4,4'-methylene-bis(cyclohexyl isocyanate) | 6.91 |
| A-2 | Tolylene diisocyanate | 5.84 |
| A-3 | Biuret of 1,6-hexamethylene diisocyanate | 13.53 |
| A-4 | Isophorone diisocyanate | 5.80 |

The slurry predispersion was formed by charging the pretreating organic polyisocyanate, titanium dioxide and 2-ethoxyethyl acetate to a pebble mill and grinding for 16 hours*. The polycaprolactone polyol and soya lecithin were then added to the slurry predispersion and the mixture was ground to a fineness of greater than Hegman 7 to produce a pigment grind. The coating was then formed, applied to Bonderite No. 37 steel panels, cured and aged in a manner similar to that used in the control.

*An effective slurry predispersion has been formed by mixing tolylene diisocyanate, titanium dioxide and a solvent in a Cowles mixer for only 20 minutes.

After 7 day aging, each of the coatings on the panels was tested for reflectance and initial gloss. The coatings on the panels were then subjected to exposure on the accelerated weathering simulator, using a cycle of 8 hours of light at 145° F. and 4 hours of darkness at 100% humidity and 115° F. Gloss was measured after about 330 hours exposure and after about 650 hours exposure. The results are reported in the table below.

| Coating | Initial Reflectance | Gardner 20° Gloss | | |
|---|---|---|---|---|
| | | Initial | 330 hrs. | 650 hrs. |
| A | 5 | 76 | 59 | 15 |
| A-1 | 10 | 89 | 84 | 62 |
| A-2 | 8 | 82 | 74 | 50 |
| A-3 | 8 | 78 | 55 | 11 |
| A-4 | 6 | 76 | 67 | 28 |

EXAMPLE 2

A series of five control coatings, identified as coatings B through F, were prepared using a procedure similar to that used for coating A in Example 1. The components used in the control coatings are indicated below.

| Pigment Grind | Weight, g. | | | | |
|---|---|---|---|---|---|
| | Coating B | C | D | E | F |
| Pigment* | 173.22 | 121.77 | 122.30 | 43.35 | 208.91 |
| 2-ethoxyethyl acetate | 108.50 | 109.79 | 111.03 | 170.51 | 102.00 |
| Polycaprolactone polyol B | 132.62 | 134.19 | 135.70 | 397.86 | — |
| Polyester polyol A | — | — | — | — | 408.00 |
| Soya lecithin | 3.46 | 2.44 | 2.45 | 0.93 | 4.18 |
| Carbon black | — | — | — | 2.49 | — |

| Coating Formulation | Weight, g. | | | | |
|---|---|---|---|---|---|
| | Coating B | C | D | E | F |
| Polyisocyanate A | 100.00 | 50.00 | 50.00 | 100.00 | 100.00 |
| Pigment grind | 146.56 | 66.78 | 65.79 | 71.93 | 253.64 |

-continued

| | | | | | |
|---|---|---|---|---|---|
| Leveling agent | 0.122 | 0.061 | 0.061 | 0.122 | 0.147 |
| Dibutylin dilaurate | 0.024 | 0.012 | 0.0123 | 0.024 | 0.029 |
| 2-ethoxyethyl acetate | 55.00 | 30.00 | 10.00 | 60.00 | 50.00 |
| Aluminum powder | — | — | — | 2.90 | — |

*Pigments used were:
B Titanium dioxide (rutile)
C Lead molybdate
D Lead chromate
E Phthalocyanine green
F Titanium dioxide (rutile)

A series of five coatings, identified as coatings B-1, C-1, D-1, E-1 and F-1, were prepared by a procedure similar to that used for coatings A-1 through A-4 of Example 1, using the pigment pretreatment procedure of the present invention. The following organic polyisocyanates were used to pretreat the pigments.

| Coating | Pretreating Organic Polyisocyanate | Weight, g. |
|---|---|---|
| B-1 | Tolylene Diisocyanate | 10.69 |
| C-1 | 4,4'-methylene-bis(cyclohexyl isocyanate) | 8.89 |
| D-1 | 4,4'-methylene-bis(cyclohexyl isocyanate) | 8.93 |
| E-1 | 4,4'-methylene-bis(cyclohexyl isocyanate) | 3.36 |
| F-1 | Tolylene diisocyanate | 12.91 |

The remaining components of coatings B-1, C-1, D-1, E-1 and F-1 were identical to the components used in control coatings B, C, D, E and F, respectively. The coatings were applied to Bonderite No. 37 steel panels, cured and aged for 7 days in a manner similar to the control coatings.

After 7 day aging, one set of coated panels of each of the applied coatings of this example was tested for initial reflectance and gloss. Each of the coatings on the panels (except B and B-1) were then subjected to 160 hours of exposure on the accelerated weathering simulator, using a cycle of 16 hours of light at 150° F. and 8 hours of darkness of 100% humidity and 140° F., and final gloss was measured. Coatings B and B-1 were subjected to the same exposure cycle as the coatings of Example 1, with gloss measured after 330 hours and 650 hours. The results are reported in the table below as average values obtained from each set of coated panels.

| Coating | Initial Reflectance | Gardner 20° Gloss Initial | 330 hrs. | 650 hrs. |
|---|---|---|---|---|
| B | 2 | 59 | 40 | 10 |
| B-1 | 9 | 89 | 84 | 57 |
| | | Initial | | 160 hrs. |

-continued

| | | | |
|---|---|---|---|
| C | 8 | 82 | 6 |
| C- | 9 | 84 | 65 |
| D | 7 | 82 | 6 |
| D-1 | 10 | 86 | 57 |
| E | 6 | 74 | 62 |
| E-1 | 7 | 76 | 68 |
| F | 9 | 84 | 60 |
| F-1 | 9 | 85 | 69 |

The results indicate in each case that the pretreated coatings had higher initial gloss and equal or higher reflectance than the corresponding untreated coatings. Moreover, the pretreated coatings exhibited a smaller loss of gloss after simulated weathering.

A second set of coated panels of each of the applied coatings (except E and E-1) was tested for the physical properties indicated in the table below. Results reported are average values for several samples of each coating.

| | Coating | | | | | | | |
|---|---|---|---|---|---|---|---|---|
| | B | B-1 | C | C-1 | D | D-1 | F | F-1 |
| Pencil hardness | 4H | 3H | 3H | 4H | 2H | 3H | 4H | 4H |
| Sward hardness | 52 | 58 | 66 | 66 | 50 | 68 | 60 | 70 |
| Gardner impact strength (face/reverse), in.-lb. | 120/100 | 160/140 | 130/160 | 140/160 | 90/90 | 160/100 | 50/2 | 80/30 |
| Chemical resistance, | | | | | | | | |
| 50/50 ethanol and water | 8 | 8 | 8 | 9 | 8 | 8 | 8 | 9 |
| linseed oil | 10 | 10 | 10 | 10 | 10 | 10 | 10 | 10 |
| 1% sulfuric acid | 6 | 8 | 7 | 9 | 8 | 9 | 9 | 9 |
| tap water | 9 | 9 | 9 | 9 | 9 | 9 | 9 | 10 |
| 3% $N_aOH$ | 4 | 9 | 7 | 9 | 9 | 9 | 9 | 10 |
| 20% $N_aOH$ | 9 | 10 | 6 | 10 | 8 | 10 | 10 | 10 |
| mustard | 6 | 7 | 9 | 9 | 9 | 9 | 8 | 9 |
| Taber abrasion resistance mg. loss | 24.5 | 23 | 20.7 | 17.5 | 27 | 24.4 | 43.5 | 32 |

The results indicate that the physical properties of the coatings which received the pretreatment of this invention were generally equal or superior to the properties of the corresponding untreated coatings.

A portion of the pigmented polyol package of each of the coatings of this example was placed in a glass jar and allowed to stand at room temperature. After 6–9 months the contents of the jars were observed for pigment settling, a measure of pigment dispersion stability. The volume per cent of pigment settling was determined by measuring the height of clear liquid at the top of the jar and the total height of liquid in the jar, forming a ratio of clear liquid to total liquid height and multiplying the ratio by 100. Thus, pigment dispersion instability is indicated by a high volume per cent settling. Results for the polyol packages of each coating are indicated in the table below.

| Polyol package | Pigment density[a] g./ml. | Volume per cent settling |
|---|---|---|
| B | 3.94 | 27 |
| B-1 | 3.94 | 11 |

-continued

| Polyol package | Pigment density[a] g./ml. | Volume per cent settling |
|---|---|---|
| C | 4.24 | 45 |
| C-1 | 4.24 | 10 |
| D | 3.26 | 20 |
| D-1 | 3.26 | 8 |
| E | 2.09 | 18 |
| E-1 | 2.09 | 3 |
| F | 3.94 | 45 |
| F-1 | 3.94 | 12 |

[a]Density of pigment as supplied by manufacturer prior to pretreatment with the organic polyisocyanate.

As would be expected, the volume per cent settling was greater for pigments of higher density. However, in each case the pigment which received the pretreatment by the process of this invention settled less than the corresponding untreated pigment.

What is claimed is:

1. In the process of producing a pigmented two-package urethane coating, the improvement which comprises:
   a. forming a slurry predispersion of the pigment in an amount of an organic polyisocyanate from 0.5 to 50% by weight of the pigment; then
   b. dispersing the slurry predispersion in the polyol package.

2. A process as claimed in claim 1, wherein there is employed from 1 to 25% by weight of the pigment of the organic polyisocyanate to form the slurry.

3. A process as claimed in claim 1, wherein the polyol package comprises a polycaprolactone polyol.

4. A process as claimed in claim 1, wherein the polyol package comprises a polyester polyol.

5. A process as claimed in claim 1, wherein said organic polyisocyanate is chosen from the group consisting of 4,4'-methylene bis(cyclohexyl isocyanate), tolylene diisocyanate, isophorone diisocyanate and the biuret of 1,6-hexamethylene diisocyanate.

6. A process as claimed in claim 1, wherein said organic polyisocyanate is 4,4'-methylene bis(cyclohexyl isocyanate).

7. A process as claimed in claim 1, wherein the pigment is titanium dioxide.

8. A pigmented polyol composition, suitable for use in the production of polyurethane coatings, comprising an organic polyol having dispersed therein a slurry predispersion of a pigment in an amount of an organic polyisocyanate from 0.5 to 50% by weight of the pigment.

9. A pigmented polyol composition as claimed in claim 8, wherein the amount of organic polyisocyanate employed in said slurry predispersion is from 1 to 25% by weight of the said pigment.

10. A pigmented polyol composition as claimed in claim 8, wherein said organic polyisocyanate is chosen from the group consisting of 4,4'-methylene bis(cyclohexyl), tolylene diisocyanate, isophorone diisocyanate and the biuret of 1,6-hexamethylene diisocyanate.

11. A pigmented polyol composition as claimed in claim 8, wherein said organic polyisocyanate is 4,4'-methylene bis(cyclohexyl isocyanate).

12. A pigmented polyol composition as claimed in claim 8, wherein said pigment is titanium dioxide.

* * * * *